(12) United States Patent
Ekberg et al.

(10) Patent No.: US 8,892,138 B2
(45) Date of Patent: Nov. 18, 2014

(54) TRANSFERRING MESSAGES IN A COMMUNICATIONS NETWORK

(75) Inventors: Christian Ekberg, Espoo (FI); Tomas Mecklin, Kyrkslätt (FI)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 111 days.

(21) Appl. No.: 13/511,438

(22) PCT Filed: Nov. 27, 2009

(86) PCT No.: PCT/EP2009/065968
§ 371 (c)(1),
(2), (4) Date: Jul. 30, 2012

(87) PCT Pub. No.: WO2011/063847
PCT Pub. Date: Jun. 3, 2011

(65) Prior Publication Data
US 2013/0190020 A1 Jul. 25, 2013

(51) Int. Cl.
*H04W 4/00* (2009.01)
*H04W 4/02* (2009.01)
*H04W 4/14* (2009.01)
*H04W 4/12* (2009.01)
*H04L 12/58* (2006.01)

(52) U.S. Cl.
CPC ............... *H04W 4/14* (2013.01); *H04W 4/008* (2013.01); *H04W 4/023* (2013.01); *H04W 4/12* (2013.01); *H04W 4/021* (2013.01); *H04L 12/5865* (2013.01); *H04L 51/20* (2013.01); *H04W 4/026* (2013.01)
USPC ....... 455/466; 455/41.2; 455/517; 455/456.2; 370/338

(58) Field of Classification Search
USPC ............................ 455/466, 41.2, 456.1–459, 455/404.1–404.2, 517–519; 370/338
See application file for complete search history.

(56) References Cited

U.S. PATENT DOCUMENTS

| | | | | |
|---|---|---|---|---|
| 4,427,968 A * | 1/1984 | York | ........................... | 340/2.81 |
| 5,493,709 A * | 2/1996 | Duckeck et al. | ........... | 455/185.1 |
| 5,633,913 A * | 5/1997 | Talarmo | ........................ | 455/446 |
| 5,797,085 A * | 8/1998 | Beuk et al. | ..................... | 455/88 |
| 5,917,887 A * | 6/1999 | Fesler et al. | .................... | 379/48 |
| 5,920,845 A * | 7/1999 | Risemberg | .................... | 705/319 |
| 5,991,687 A * | 11/1999 | Hale et al. | ..................... | 701/470 |
| 6,731,940 B1 * | 5/2004 | Nagendran | ................ | 455/456.1 |
| 6,799,035 B1 * | 9/2004 | Cousins | ........................ | 455/418 |

(Continued)

OTHER PUBLICATIONS

Singh, G. "Bump uses the iPhone or iPod Touch's accelerometer." Ub News [online] Apr. 26, 2009, pp. 1-3 [retrieved on Feb. 8, 2010]. Retrieved from the Internet: <URL:http://ub-news.com/news/bump-uses-the-iphone-or-ipod-touch-accelerometer/2196.html>.

(Continued)

*Primary Examiner* — Sharad Rampuria
(74) *Attorney, Agent, or Firm* — Coats & Bennett, P.L.L.C.

(57) ABSTRACT

A method and apparatus for transferring a message from a wireless communication device to another communication device. A communications device generates a message using the wireless communication device. The wireless communication device determines a geographical location and an orientation of the wireless communication device. A geographical region is determined using the geographical location and orientation, and a remote server determines the presence of an entity associated with the other communication device in the selected geographical region. The message is then transferred to the other communication device.

16 Claims, 4 Drawing Sheets

(56) References Cited

U.S. PATENT DOCUMENTS

| | | | |
|---|---|---|---|
| 7,215,246 B1* | 5/2007 | Beard et al. | 340/539.11 |
| 7,225,280 B2* | 5/2007 | Moran | 710/74 |
| 7,339,467 B2* | 3/2008 | Lamb | 340/539.1 |
| 7,409,224 B1* | 8/2008 | Lemke et al. | 455/556.2 |
| 7,427,926 B2* | 9/2008 | Sinclair et al. | 340/4.2 |
| 7,991,380 B2* | 8/2011 | Collins et al. | 455/404.1 |
| 8,626,148 B2* | 1/2014 | Lee et al. | 455/421 |
| 8,644,761 B2* | 2/2014 | Iwasaki | 455/41.1 |
| 2001/0016487 A1* | 8/2001 | Hiatt, Jr. | 455/422 |
| 2002/0065065 A1* | 5/2002 | Lunsford et al. | 455/411 |
| 2005/0265535 A1* | 12/2005 | Kanada | 379/202.01 |

OTHER PUBLICATIONS

Dinan, M. "IPhone Bump App: Exchanging Contact Info on the IPhone, One Pow at a Time." TMCnet Editor [online], Apr. 28, 2009, pp. 1-4 [retrieved on Feb. 8, 2010]. Retrieved from the Internet: <URL:http://iphone.tmcnet.com/topics/iphone/articles/55072-bump-app-exchanging-contact-info-the-iphone-one.htm>.

* cited by examiner

TRANSFERRING MESSAGES IN A COMMUNICATIONS NETWORK

TECHNICAL FIELD

The invention relates to the field of transferring messages in a communications network.

BACKGROUND

Wireless mobile communications networks typically rely on an address, such as an IP address or a telephone number, in order to allow a user to communicate with another user. When a sending user wishes to send a message to a receiving user, for example a Short Message Service (SMS) message or a message for establishing a telephone call, the sending user must already know the address of the receiving user.

There are some circumstances where the sending user does not have access to the address of the receiving user. For example, consider the situation where the sending user is watching a football match at a pub, and the user does not have the addresses of any of the other people in the pub. If the sending user wishes to share, for example, media content such as a news flash, with the other people in the pub, he has no way of doing this as he does not have the addresses of the other people present.

One way to send a message without knowing the receiving user's address is to create a short range Personal Area Network (PAN) using a technology such as Bluetooth™. The message can then be sent to other users within the range of the PAN who have communication devices using compatible PAN technology, and are willing to accept the message. However, PANs typically have a very limited range, and the message can only be sent to receiving users who have communication devices with compatible hardware.

Another way to send a message without knowing the receiving user's address is to use a technology such as infra red (IR) data transmission. A modulated IR beam is generated by the sending user's communication device and used to encode the message. In order for the receiving user to receive the message, the receiving user's communication device must have a line-of-sight with the sending user's communication device. IR data transmission is therefore only suitable for very short ranges and communication with no more than one communication device at a time.

SUMMARY

It is an object of the invention to mitigate the problems associated with known ways communicating with other communication devices when the address of the recipient is not known. The invention relies on determining the location of the other communication device or an entity associated with the communication device on the basis of the orientation or direction of motion of the communication device.

According to a first aspect of the invention, there is provided a server for use in a wireless communications network. The server is provided with a receiver for receiving from a communication device information usable to identify a geographical region relative to a geographical location and an orientation of the communication device. A presence function is also provided for determining the presence of an entity associated with another communication device, the entity being located in the identified geographical region. A transmitter is provided for either sending a message to the other communication device, or sending an address associated with the other communication device to the communication device. In this way, a message can be forwarded to the other communication device, or communication device can use the received address to send a message to another communication device.

The server is optionally provided with a geographical region determination function for determining a geographical region using a received geographical location and orientation the communication device.

As an option, the receiver is arranged to receive a message from the communication device, and the transmitter is arranged to forward the message to the other communication device.

According to a second aspect of the invention, there is provided a mobile communication device for use in a wireless telecommunications network. The mobile communication device is provided with a message generating function for device to generate a message. A geographical location function is provided for determining a geographical location of the communication device, and an orientation determination function is also provided for determining an orientation of the communication device. A transmitter is provided for sending the message to a further communication device associated with an entity located in a geographical region determined using the determined geographical location and orientation. This allows a user of the communication device to point at a geographical location, and send a message to other communication devices associated with entities in that geographical region, without the user needing to know the addresses of the other communication devices.

As an option, the communication device is provided with a motion detection function for detecting a motion of the wireless communication device in the direction of the geographical location of an entity associated with the other communication device. The transmitter is arranged to send the message as a consequence of the motion, which allows the user to "throw" a message to another communication device.

Optionally, the transmitter is arranged to send the determined geographical location and orientation to a remote server, in which case the remote server can determine the geographic region.

The transmitter is optionally arranged to send the generated message to the remote server for forwarding by the remote server to the further communication device. Alternatively, the communication device is provided with a receiver for receiving from the remote server an address of the further communication device, in which case the transmitter is further arranged to send the generated message to the further communication device using the received address.

Whilst it has been described above that a remote server can determine the geographical region, as an optional alternative, the communication device may be provide with a geographical region module arranged to determine the geographical region relative to the geographical location and direction of orientation. In this case, the transmitter is further arranged to send the determined geographical region to a remote server.

According to a third aspect of the invention, there is provided a method of transferring a message from a wireless communication device to another communication device. A user generates a message using the wireless communication device. The wireless communication device determines a geographical location and an orientation of the wireless communication device. A geographical region is determined using the geographical location and orientation, and the presence of an entity associated with the other communication device in the selected region is determined. The message is then transferred to the other communication device.

As an option, the method further comprises detecting a motion of the wireless communication device in the direction of the geographical location of an entity associated with the other communication device, and transferring the message to the other communication device as a consequence of detecting the motion. As a further option, a distance between the geographical region and the wireless communication device is determined by the velocity of the motion.

Optionally, the entity associated with the other communication device is the other communication device.

As processing power is typically limited at the wireless communications device, the steps of selecting a geographical region in the direction of orientation and determining the presence of the entity associated with the other communication in the selected region are optionally performed at a remote server. In this case, the remote server optionally either forwards the message to the other communication device, or sends an address of the other communication device to the communication device, thereby allowing the communication device to send the message to the other communication device.

According to a fourth aspect of the invention, there is provided a computer program, comprising computer readable code means which, when run on a server, causes the server to behave as a server as described above in the first aspect of the invention.

According to a fifth aspect of the invention, there is provided a computer program, comprising computer readable code means which, when run on a communication device, causes the communication device to behave as a communication device as described above in the second aspect of the invention.

DETAILED DESCRIPTION

A sending user having a communication device wishes to send a message to a communication device associated with an end-point. The sending user does not have an address for the end-point, but simply knows the approximate geographical location of the end-point relative to the sending user.

In one embodiment, the end-point is the communication device associated with the end-point, for example when the sending user's communication device is used simply to send a message to another communication device based on that communication device's location. In an alternative embodiment, the end-point may be geographically remote from the communication device associated with the end-point. For example, the end-point may be a historical building, and the communication device associated with the historical building is a library or City server that holds historical information on the historical building. In the first embodiment, the geographical location of the end-point (i.e. the communication device), is dynamic. In the alternative embodiment, the geographical location of the end-point is static. The invention will work in either case provided that accurate and up-to-date information about the geographical location of the end-point is available.

In order for the user to send the message according to the geographical location of the end-point, the user generates the message using their communication device, and moves their communication device in the geographical direction of the required end-point. This may be in the form of a throwing action. The user communication device, determines the direction of movement. A forwarding message is then sent to a remote server. The forwarding message includes the generated message, and the determined direction of movement. The remote server uses the current geographical location of the communication device and the determined direction of movement to select one or more end-points that the message can be sent to. Information about other end-points is stored (which may be dynamically updated where the end-points location can change) and, based on the calculated path, the possible destinations are resolved from the collection of known end-points. The generated message is then sent to communication devices associated with those end-points The location of the first user communication device can be determined using any suitable mechanism, for example by determining the mobile cell via which the communication device is attached to the communication network, using Global Positioning System (GPS) data, using indoor positioning (WLAN), and so on.

Once the message has been generated, the trigger for sending it is the throwing action made by the user in the desired direction applying a desired force. By collecting sensor information about the movement (for example using one or more motion sensors) of the communication device, and geographical direction (for example using an eCompass) of the communication device, the point of origin is determined in addition to the bearing and distance of the message.

Figure 1:
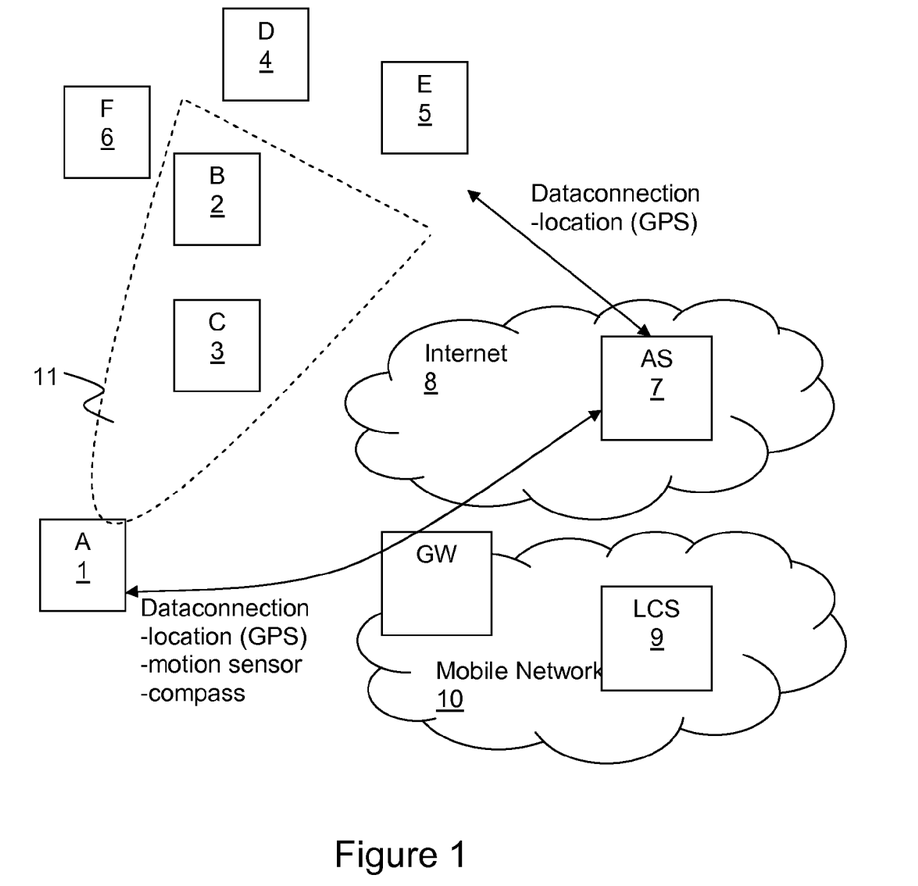
FIG. 1 illustrates schematically in a block diagram a network architecture according to an embodiment of the invention.

FIG. 1 illustrates an example in which User A 1 wishes to send a message in a certain direction. In this example, users B 2, C 3, D 4, E 5 and F 6 all use the same application and are registered with an Application Server (AS) 7 located in Internet 8. When a user starts the application on the mobile phone, the current position is sent to the AS 7. In case of non-GPS terminals, the position can be retrieved using the user's operator Location Services (LCS) application 9 located in the user's mobile access network 10.

User A 1 wishes to throw a message in a certain direction, for example the users B 2 and C 3 in a pub. User A 1 composes the message using the application on the communication device (mobile phone) and makes a throwing movement in the target direction (toward the users in the pub). When the throwing movement comes to a stop, an application at User A's communication device collects information relating to the current location of the communication device, movement information from a motion sensor at the communication device, and direction of movement from an electronic compass. The information is sent to the AS 7. Optionally, User A 1 can indicate the type of notification that should be sent to the receiver of the message. Of course, whilst the description is based on a "throwing" movement, it will be appreciated that the invention could also be implemented in a "point and click" way. In this way, the user simply points his communication device in a certain direction and "clicks" to send the message. A determination of motion is not made in this case, but a determination of the orientation of the device is required to determine the direction.

The AS 7 determines the flight sector 11 of the message by using the information sent by User A 1. The flight sector 11 is a geographical region that corresponds to a calculated path of "flight" that the message would take if it were a physical object that had been thrown. The AS 7 then uses location information of other end-points registered with the AS to determine possible target end-points within the flight sector. In this example, the AS 7 determines that User B 2 and User C 3 are end-points within the flight sector 11.

The AS 7 sends a notification to the Users B and C 2, 3 of the incoming message. using a data-channel. A response message may be sent to User A 1 indicating that the message has been successfully delivered, and possibly the identities and/or addresses of the users 2, 3 to whom the message has been successfully delivered.

When Users B and C 2, 3 receive the notification, the each decide whether to accept the message, or not. If the user accepts the message, the AS 7 delivers the generated message to each accepting user. If a user declines to accept the message, or does not respond to the notification, then the generated message will not be delivered and eventually will be deleted after a predetermined message time-to-live.

The size of the flight sector can vary on factors such as the speed of motion, angle of elevation, rotational motion etc. It can also vary depending on application. In some scenarios it might be desirable to throw a message hundreds of kilometers, for example from Helsinki to Turku. In this case, the size of the flight sector relative to the speed of throwing motion may be larger than an application where it is sufficient to be able "throw" a message across a room.

In an alternative embodiment otherwise compatible with the first embodiment, User A's communication device 1 calculates the flight sector and sends this directly to the AS 7, which then determines other end-points in the flight sector.

The services are not limited to sending messages between end-points, but any service provided by the communication network may be initiated. For example, a voice call may be established between User A 1 and User B 2. The service may also be used to leave messages at certain locations or areas for other end-points to detect when entering the specified location or area. For example, User A 1 may "throw" a message at an electronic notice board for storage at the notice board. Note that the notice board need not contain the communication device, but may simply be an entity at a particular geographical location that ha a remote communication device associated with it.

Figure 2:
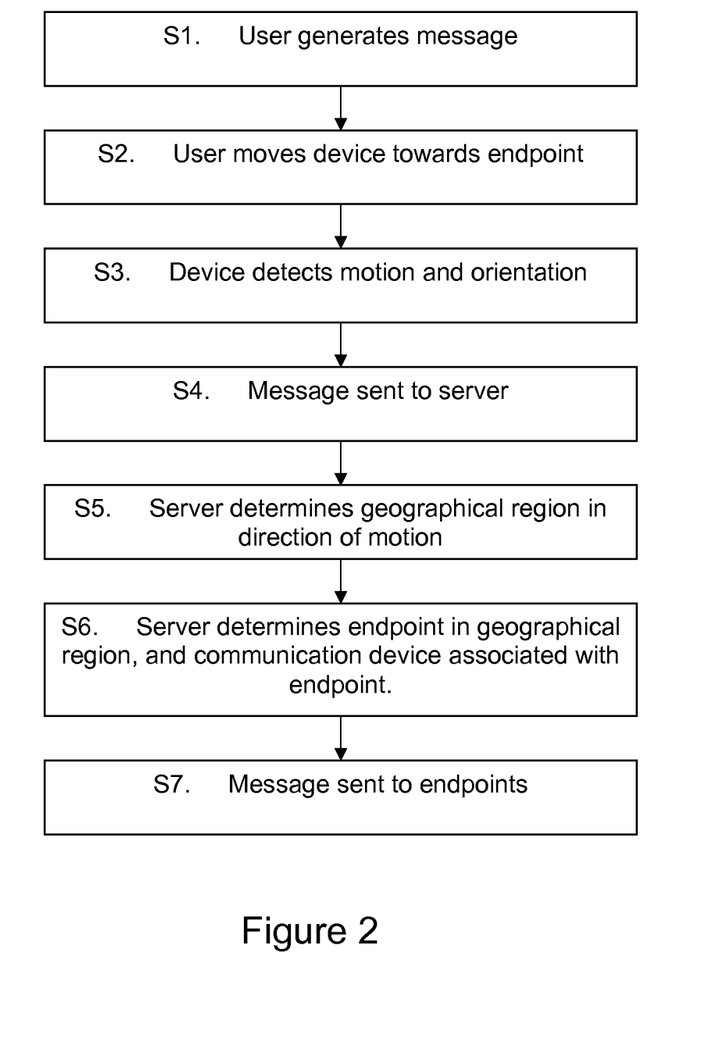
FIG. 2 is a flow diagram illustrating embodiments of the invention.

Referring to FIG. 2, the invention is illustrated in a flow diagram with the following numbering corresponding tot he numbering of FIG. 2:

S1. User A 1 generates a message using his communication device.
S2. User A 1 moves his communication device towards an end-point to which he wishes to send the message.
S3. User A's communication device detects its geographical location, the direction of movement, and in one embodiment a velocity of movement. In one embodiment, the communication device determines the flight sector 11 using the location and movement information.
S4. User A's communication device sends a message to the AS 1. The message may contain the generated message in addition to either the determined flight sector 11 or the location and movement information.
S5. If the message sends the location and movement information, then the AS 7 determines the flight sector 11.
S6. The AS 7 determines end-points having a geographical location within the flight sector, and, if any end-points are not communication devices, then the AS 7 determines the communication devices associated with those end-points
S7. The AS 7 either forwards the generated to the determined endpoints, or sends a message to User A's communication device with the addresses of the communication devices associated with the end-points, allowing User A's communication device to send the generated message to the communication devices associated with the end-points.

Figure 3:
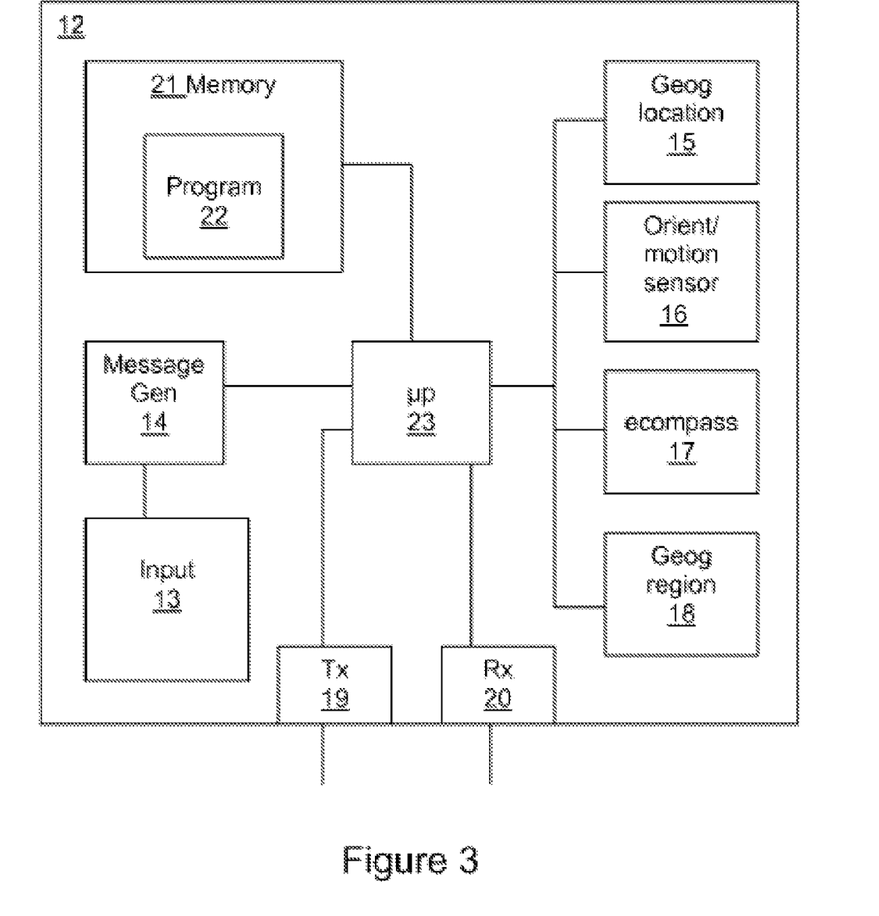
FIG. 3 illustrates schematically in a block diagram a communication device according to an embodiment of the invention.

Referring now to FIG. 3, there is illustrated a communication device 12. The communication device 12 is provided with a user input device 13 such as a keyboard or touch screen that allows a user to input information. The input device 13 is operatively connected to a message generating function 14 that generates a message.

A geographical location function 15 is provided for determining the geographical location of the communication device 12. The geographical location function may determine the location using, for example, GPS, an operator-enabled location based service, WiFi location system and so on.

A motion sensor 16 is used to detect a motion and a direction of the motion. It may also detect a velocity of motion and an elevation of motion, to assist in calculating a flight sector. This may be coupled to an ecompass 17 to provide directional information. In an alternative embodiment, only the ecompass is required to provide orientation information.

In an embodiment of the invention, the communication device is provided with a geographical region calculating module 18 for calculating the flight sector using the information obtained from the geographical location function 15, motion sensor 16 and ecompass 17.

A transmitter 19 is provided for sending information to the AS 7. This information may include the generated message, and either the calculated flight sector or the geographical location and motion information.

A receiver 20 is provided for the embodiment of the invention in which the AS 7 replies to the communication device 12 with a list of addresses of communication devices associated with end-points. In this case, the transmitter 19 may be further used to send the generated message to the communication devices associated with the endpoints.

The above description assumes a hardware implementation of the invention, although the skilled person will appreciate that certain elements, for example, the geographical location function 15 and the geographical region calculating module 18 may be implemented using software. In this case the device contains a computer readable medium in the form of a memory 21 at which a computer program 22 is stored, and a processor 23 for running the computer program.

Figure 4:
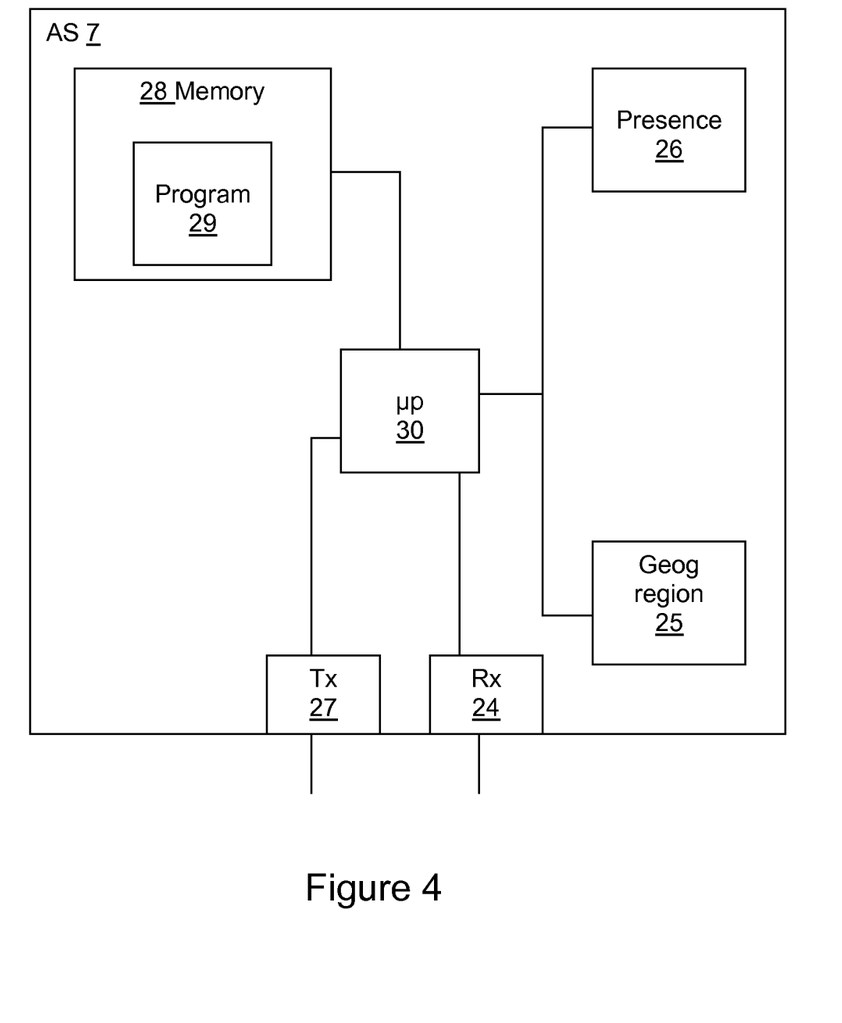
FIG. 4 illustrates schematically in a block diagram a server according to an embodiment of the invention.

Referring now to FIG. 4, there is illustrated an AS 7. The AS 7 is provided with a receiver 24 for receiving a communication from the communication device 12. As described above, this may include a generated message, a calculated flight sector, or location and orientation (and possibly motion) information relating to the communication device 12. Where the communication only includes the location and orientation (or motion) information, a geographical region determination function 25 is provided for determining the flight sector 11.

A presence function 26 is provided for determining the presence of entities located in the flight sector 11, and for identifying a communication device associated with each entity.

A transmitter 27 is provided for either sending the generated message to the identified communication devices, or for sending addresses of the identified communication devices to the communication device 12. User A 1 sender of the message may choose to deliver the generated message as a "multicast", where the generated message is sent to multiple receivers, or as "single-shot", where the message can be received by only a limited number of receivers who match a predetermined profile (e.g. supporters of a particular football team). In this case, User A must specify parameters relating to the intended recipients.

The above description assumes a hardware implementation of the invention, although the skilled person will appreciate that certain elements, for example, the presence function 26 and geographical region determination function 25 may be implemented using software. In this case the device contains a computer readable medium in the form of a memory 28 at which a computer program 29 is stored, and a processor 30 for running the computer program.

The above description refers to User A sending a message to one or more further communication devices associated with endpoints located in a geographical region relative to the location and direction of movement of User A's 1 communication device. The term "message" is used to refer to any type of signalling that the communication device sends or receives, such as signalling to set up a session (for example a SIP INVITE), a message containing media content, and so on. The skilled person will appreciate that the message can take many forms, and the following list is a non-exhausted list of examples of the types of message that may be sent:

Messages related to gaming;
geo-caching;
remote ping-pong (which allows remote users still to play games such as ping-pong);
virtual phone throwing (phone throwing is a growing sport in which participants must throw a mobile telephone as far as they can. This results in damage to the mobile telephone. Using the invention, the mobile telephone need not be physically thrown);
chain-letters;
advertising;
multicasting a message to users within an area;
augmented reality (allowing the user to interact with a virtual world based on the orientation, location and motion of his communications device);
"throwing" a request towards a static subject such as a building or statue and receiving information relating to the subject
car parking payments; pay parking fee based on the position of the user's car;
establishing a telephone call with a user;
exchanging contact information;
security (for example, a door can only be accessed by a user with the right device).

Various community services can also be enhanced using the invention. For example messages can be sent to members/ friends in a specific community (e.g. Facebook™) in a specified area. Messages may be also published on Facebook on the recipients' displays. By combining various web- and community service, new features can be published.

The solution is enabled by combining on-board technologies, namely (electronic) compass and motion sensor, as well as positioning technologies. The positioning technology may be based on combining this information with the speed of the movement in order to calculate the flight-path.

Various embodiments and possible uses for the invention have been described above, but it will be appreciated by a person of skill in the art that various modifications may be made to the above-described embodiments without departing from the scope of the invention as defined by the appended claims.

The invention claimed is:

1. A server for use in a wireless communications network, the server comprising circuitry configured as:

a receiver configured to receive, from a first communication device, information usable to identify a target geographical region, the received information including a geographical location of the first communication device, and data describing a flight sector of the first communication device;

a presence function configured to determine the presence of an entity associated with a second communication device, the entity being located in the target geographical region; and a transmitter configured to perform one of:
sending a message to the second communication device; and
sending an address associated with the second communication device to the first communication device.

2. The server of claim 1, wherein the circuitry is further configured as a geographical region determination function configured to determine a geographical region of the first communication device using the received geographical location and the data describing the flight sector of the first communication device.

3. The server of claim 1:
wherein the receiver is further configured to receive a message from the first communication device; and
wherein the transmitter is configured to forward the message to the second communication device.

4. A first mobile communication device for use in a wireless telecommunications network, the first mobile communication device comprising circuitry configured as:

a message generating function for allowing a user of the device to generate a message;

a geographical location function configured to determine a geographical location of the first communication device;

a motion detection determination function configured to determine a flight sector of the first communication device; and a transmitter configured to send the message to a second communication device associated with an entity located in a target geographical region determined using the determined geographical location and the determined flight sector.

5. The mobile communication device of claim 4, wherein the transmitter is further configured to send the message responsive to the first communication device moving along the flight sector.

6. The mobile communication device of claim 4, wherein the transmitter is further configured to send the determined geographical location and the determined flight sector to a remote server.

7. The mobile communication device of claim 6, wherein the transmitter is configured to send the generated message to the second communication device by sending the generated message to the remote server for forwarding by the remote server to the second communication device.

8. The mobile communication device of claim 6:
wherein the circuitry is further configured as a receiver configured to receive, from the remote server, an address of the second communication device; and
wherein the transmitter is further configured to send the generated message to the second communication device using the received address.

9. The mobile communication device of claim 4:
wherein the circuitry is further configured as a geographical region module configured to determine the target geographical region relative to the geographical location of the first communication device and the flight sector of the first communication device; and wherein the transmitter is further configured to send the determined geographical region to a remote server.

10. A method of transferring a message from a first wireless communication device to a second communication device, the method being implemented by a remote server and comprising:
   receiving, from the first wireless communication device, a geographical location of the first wireless communication device and data describing a flight sector of the first wireless communication device;
   determining a target geographical region of the first communication device using the geographical location and the data describing the flight sector; and
   determining the presence of an entity in the target geographical region, the entity being associated with the second communication device.

11. The method of claim 10, wherein the transfer of the message to the second communication device is performed responsive to the first wireless communication device moving along the flight sector.

12. The method of claim 11 wherein a distance between the target geographical region and the geographical region of the first wireless communication device is determined based on the data describing the flight sector, which includes a velocity of the first wireless communication device along the flight sector.

13. The method of claim 10 wherein the entity associated with the second communication device is the second communication device.

14. The method of claim 10, further comprising one of the following:
   forwarding a message from the first communication device to the second communication device; or
   sending an address of the second communication device to the first communication device, thereby allowing the first communication device to send a message to the second communication device.

15. A computer program product stored in a non-transitory computer-readable medium, the computer program product comprising program instructions for communicating between mobile communication devices, the computer program product comprising computer program code which, when run on a first mobile communication device, configures the first mobile communication device to:
   generate a message for a second mobile communication device;
   determine a geographical location of the first communication device;
   determine a flight sector of the first communication device; and
   send a message to the second communication device, the second communication device being associated with an entity located in a target geographical region determined using the determined geographical location and the flight sector.

16. A computer program product stored in a non-transitory computer-readable medium, said computer program product comprising program instructions for facilitating communication between mobile communication devices, the computer program product comprising computer program code which, when run on an application server, configures the application server to:
   receive from a first communication device information usable to identify a target geographical region, the received information including a geographical location of the first communication device, and data describing a flight sector of the first communication device;
   determine the presence of an entity associated with a second communication device, the entity being located in the target geographical region; and
   either send a message to the second communication device or send an address associated with the second communication device to the first communication device.

* * * * *